United States Patent
Kuczynski et al.

(10) Patent No.: US 10,969,341 B2
(45) Date of Patent: Apr. 6, 2021

(54) COLORIMETRIC DETECTION OF AIRBORNE SULFUR

(71) Applicant: International Business Machines Corporation, Armonk, NY (US)

(72) Inventors: Joseph Kuczynski, North Port, FL (US); Timothy Tofil, Rochester, MN (US); Sarah Czaplewski-Campbell, Rochester, MN (US); Eric Campbell, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 15/824,444

(22) Filed: Nov. 28, 2017

(65) Prior Publication Data

US 2019/0162671 A1 May 30, 2019

(51) Int. Cl.
*G01N 21/78* (2006.01)
*G01N 31/22* (2006.01)
*G01N 21/77* (2006.01)

(52) U.S. Cl.
CPC .......... *G01N 21/783* (2013.01); *G01N 31/22* (2013.01); *G01N 31/223* (2013.01); *G01N 2021/7756* (2013.01); *Y10T 436/188* (2015.01)

(58) Field of Classification Search
CPC ............. Y10T 436/18; Y10T 436/182; Y10T 436/184; Y10T 436/186; Y10T 436/188; G01N 33/0036; G01N 33/0042; G01N 33/0044; G01N 21/78; G01N 21/783; G01N 31/22; G01N 31/223
See application file for complete search history.

(56) References Cited

U.S. PATENT DOCUMENTS

| | | | |
|---|---|---|---|
| 2,800,397 A * | 7/1957 | Offutt | G01N 21/8483 436/44 |
| 4,119,089 A | 10/1978 | Preti et al. | |
| 5,077,010 A * | 12/1991 | Ishizaka | B01L 3/505 422/408 |

(Continued)

FOREIGN PATENT DOCUMENTS

CN 205538655 U 8/2016

OTHER PUBLICATIONS

Lim, S. H. et al. "A colorimetric sensor array of porous pigments," Analyst, 2009, 134, 2453-2457. Including Supporting Information. (Year: 2009).*
Meng, Q. et al. "Preparation of a natural dye doped Ormosil coating for the detection of formaldehyde in the optical gas sensor," Sensors and Actuators B 196 (2014) 238-244 (Year: 2014).*

(Continued)

*Primary Examiner* — Christopher Adam Hixon
*Assistant Examiner* — Michelle Adams
(74) *Attorney, Agent, or Firm* — Peter Edwards

(57) ABSTRACT

A method, device, and article of manufacture for detecting airborne sulfur, the method including obtaining a gel solution; applying the gel solution onto film; exposing a frame of the film on the film reel to surrounding air, where the surrounding air contains a concentration of airborne sulfur; and detecting a color change in the gel solution, where the color change is a response to a reaction between the amount of airborne sulfur and at least one component of the gel solution. The device may include a detector; a film; and a gel solution applied to a film. The article of manufacture may include a film; and a gel solution applied to a film.

8 Claims, 3 Drawing Sheets

(56) References Cited

U.S. PATENT DOCUMENTS

| | | | | |
|---|---|---|---|---|
| 6,361,225 | B1* | 3/2002 | Szajewski | G03D 5/062 |
| | | | | 396/604 |
| 7,261,857 | B2 | 8/2007 | Suslick et al. | |
| 8,268,251 | B2* | 9/2012 | Boday | G01N 21/77 |
| | | | | 422/91 |
| 2006/0252848 | A1* | 11/2006 | Guillaume | B01D 53/02 |
| | | | | 523/122 |
| 2010/0166604 | A1* | 7/2010 | Lim | G01N 21/253 |
| | | | | 422/400 |
| 2012/0304729 | A1* | 12/2012 | O'Dell | G01N 21/783 |
| | | | | 73/1.02 |
| 2016/0084771 | A1 | 3/2016 | Chen et al. | |
| 2017/0027482 | A1* | 2/2017 | Zilberstein | A61B 5/14546 |
| 2018/0072872 | A1* | 3/2018 | Pires Fortes Ferreira | |
| | | | | G01N 21/78 |

OTHER PUBLICATIONS

Sommer, "A Color Test for Elementary Sulfur in Pyridine and Other Solvents," Analytical Edition, Jun. 15, 1940, pp. 368-369.

Unknown, "Acrylamide and Bis-Acrylamide Solutions," Bio-Rad, Printed Nov. 28, 2017, 8 pages http://www.bio-rad.com/webroot/web/pdf/lsr/literature/LIT492.pdf.

Unknown, "Corrosion Monitoring and Chemical Management Systems," Atmospheric & Environmental Corrosion Monitoring, Cosasco, Printed Nov. 28, 2017, 1 page https://www.cosasco.com/atmospheric_environmental.php.

Unknown, "Handcasting Polyacrylamide Gels," Bio-Rad, Bulletin 6201, Printed Nov. 28, 2017, Copyright 2014 Bio-Rad Laboratories, Inc., 4 pages http://www.bio-rad.com/webroot/web/pdf/lsr/literature/Bulletin_6201.pdf.

Unknown, "Preparing SDS Gels," Experimental Biosciences, Printed Nov. 28, 2017, 3 pages http://www.ruf.rice.edu/~bioslabs/studies/sds-page/gellab2a.html.

* cited by examiner

COLORIMETRIC DETECTION OF AIRBORNE SULFUR

BACKGROUND

The present disclosure relates to airborne sulfur contamination and, more specifically, to the detection of airborne sulfur to prevent contamination.

Photodetectors are detectors, or sensors, of light and electromagnetic energy. Photodetectors may convert photons, a fundamental particle, from the light into electrical current, where the current indicates an absorption of light. Photodetectors may use semiconductors such that light is absorbed and generates a photocurrent.

SUMMARY

Various embodiments are directed toward a method of detecting airborne sulfur, the method including obtaining a gel solution; applying the gel solution onto film; exposing a frame of the film on the film reel to surrounding air, where the surrounding air contains a concentration of airborne sulfur; and detecting a color change in the gel solution, where the color change is a response to a reaction between the amount of airborne sulfur and at least one component of the gel solution.

Additional embodiments are directed to a device for detecting airborne sulfur, the device including: a detector; a film; and a gel solution applied to a film.

Additional embodiments are directed to an article of manufacture for detecting airborne sulfur, the article of manufacture including: a film; and a gel solution applied to a film.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
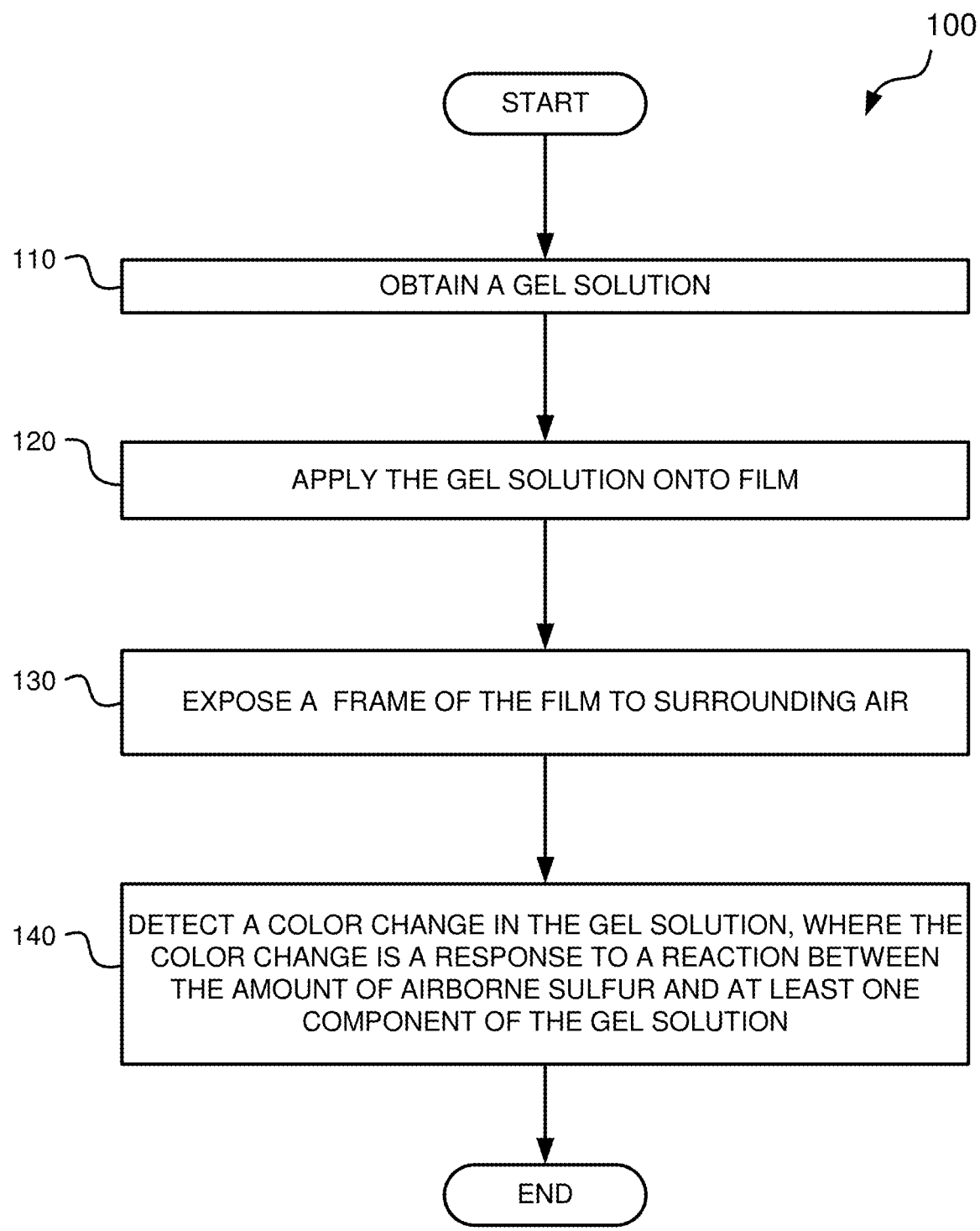
FIG. 1 depicts a flowchart of a set of operations for detecting airborne sulfur, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to airborne sulfur contamination and, more specifically, to the detection of airborne sulfur to prevent contamination. While the present disclosure is not necessarily limited to such applications, various aspects of the disclosure may be appreciated through a discussion of various examples using this context.

Sulfur is a nonmetal element that reacts with most elements, generally excluding the noble gases, gold, platinum, tellurium, and iridium. Sulfur may be a pollutant from natural gas and petroleum. Gaseous sulfur (i.e., airborne sulfur) contamination in data centers may lead to thick film resistor failure, circuit board creep corrosion resulting in system failure, or other system issues on electronic devices. Therefore, it may be beneficial to have the ability to assess airborne sulfur levels present in a data center environment. Some methods may be highly expensive, may require custom hardware that may be difficult to find or prepare, and/or may rely on corrosion coupons which must be analyzed after a time of exposure. Corrosion coupons may detect corrosion as the corrosion is occurring, but may not detect corrosion before the corrosion has occurred. Further, known gas sensors may have the ability to detect sulfur oxides in the air, but may not be able to detect gaseous, or airborne sulfur. Airborne sulfur as discussed herein, may be elemental sulfur (e.g., $S_8$) and/or any compound containing sulfur (e.g., hydrogen sulfide, carbonyl sulfide, sulfur dioxide, methyl mercaptan, etc.).

The present disclosure provides a method, device, and article of manufacture for detecting airborne sulfur to prevent contamination and corrosion. In some embodiments, the method, device, or article of manufacture may utilize film reels in a reel-to-reel format. Film (e.g., Polyester film) may be treated with a color-indicating solution that is sensitive to airborne sulfur. For example, a solution of pyridine or quinoline and a base (e.g., sodium hydroxide, sodium bicarbonate, etc.) may be immobilized in a gel, such as a polyacrylamide, or acrylamide, gel or a polydimethylsiloxane gel. The gel may be applied to a film, such as polyester film, and the film may be wound into a film reel. The film may be deployed in a data center, where the reel is unwound one frame at a time to expose a frame. The unexposed frames may remain wound on the reel and are not exposed to the ambient air. The reel and the unexposed frames may be hermetically sealed in a box such that the reel and the unexposed frames may be stored in an airtight container and may have no pre-exposure to any airborne sulfur. The box may include an opening with a gasket such that some of the film, such as a single frame of a film strip, can exit through the opening, but the remaining frames on the reel remain sealed in the airtight container to prevent exposure to air. In the presence of airborne sulfur, the indicating solution (e.g., a solution of pyridine or quinoline and a base) in the gel will change color based on the concentration of the sulfur in the air. Thus, the resulting color change may be used as an indication of the level of airborne sulfur in the data center.

Referring now to FIG. 1, a flowchart 100 of a set of operations for detecting airborne sulfur is depicted, according to various embodiments. Method 100 begins with operation 110 to obtain a gel solution. The gel solution may be a mixture of a solution of pyridine, or quinoline, and a base (e.g., sodium hydroxide, sodium bicarbonate, etc.) with a gel. The pyridine (or quinoline)/base solution may be immobilized in the gel. Immobilizing the pyridine may prevent or limit pyridine odor. In various embodiments, the gel is a polyacrylamide or a polydimethylsiloxane gel. The gel (to be mixed with the pyridine/base solution) may be prepared via gel cassettes by polymerizing acrylamide (or dimethyl siloxane) and creating a gel mixture. Pyridine and a base may be added to the gel mixture such that the porous gel is impregnated throughout with the pyridine/base (or indicator) solution. The gel mixture may be overlaid with water-saturated butanol to form a smooth, level surface at the top of the gel cassette. After a period of time, the gel mixture will polymerize and become set. The pyridine/base solution may indicate the concentration of airborne sulfur surrounding the solution (i.e., surrounding air). In some embodiments, the surrounding air is the air within a certain radius (e.g., fifty feet) or location (e.g., a room) of the solution. The method of preparing the gel as described herein is an example method and the gel may be prepared using other methods.

After receiving a gel solution, the gel solution is applied onto film in operation 120. The film may be any type of film, such as polyester film (e.g., 35 mm camera film). In some embodiments, the gel solution is contained within a gel cassette and the gel cassette is applied to the film. In other embodiments, the gel solution is applied to the gel using other methods. After the gel solution is applied to the film, the film may be wound onto a reel. The outer layers of the wound film may offer some protection against exposure of airborne sulfur to the inner layers of the wound film.

In various embodiments, method 100 continues with operation 130 to expose one or more frames of the film to surrounding air. In various embodiments, the film reel is hermetically sealed in a box. This box may have an opening with a gasket that allows portions of film to be exposed to the air surrounding the box while preventing the exposure of the rest of the film. In some embodiments, the film is not wound on a film reel and is hermetically sealed in a box without the film reel. In some embodiments, the exposure of the film to the surrounding air, and therefore the determination of whether airborne sulfur is in the surrounding air, is an automated process using a detection device or a manual process.

In various embodiments, method 100 continues with operation 140 to detect a color change in the gel solution. This color change may be a response of a reaction between the amount of airborne sulfur and at least one component of the gel solution. For example, exposing a single frame (e.g., in operation 130) of the film includes exposing the single frame for a predetermined amount of time (e.g., one day, one week, etc.). In some embodiments, an exposed frame may be monitored for possible color change of the gel solution while the frame is exposed. In other embodiments, the frame may not be analyzed until after the predetermined amount of time.

In various embodiments, the gel solution changes to various colors and/or color variations if exposed to certain differing concentrations of airborne sulfur. For example, if the base in the gel solution is sodium hydroxide, the gel solution may turn a deep red-brown when there is approximately a 10,000 parts per million (ppm) (i.e., 1%) concentration of sulfur in the air. The gel solution may turn a dark olive-green with a 1000 ppm (0.1%) concentration of sulfur in the air. When there is a 100 ppm concentration of sulfur in the air, the gel solution may turn a green-blue color. The gel solution may turn a light blue with a 10 ppm concentration of sulfur in the air. With a sulfur concentration of approximately 3 ppm, the gel solution may turn a trace of blue. In some embodiments, with a longer exposure to airborne sulfur, such as a week, smaller concentrations of sulfur in the air (e.g., concentrations smaller than 10 ppm) may be detected by the gel solution. For example, a concentration of sulfur in the air smaller than 10 ppm may react with the gel solution, and with a longer exposure, may cause a detectable color change of the gel solution (e.g., a visible color change)

In another example, when the base in the gel solution is sodium bicarbonate, the gel solution may turn a deep green-blue when there is a 1% or 10,000 part per million (ppm) concentration of sulfur in the air. The gel solution may turn a dark blue with a 0.1% or 1000 ppm concentration of sulfur in the air. When there is a 100 ppm concentration of sulfur in the air, the gel solution may turn a blue color, less dark than the previously discussed dark blue. The gel solution may turn a light blue color with a 10 ppm concentration of sulfur in the air. With a sulfur concentration of approximately 3 ppm, the gel solution may turn a very light blue.

In some embodiments, method 100 may further include analyzing the color change of the gel solution by comparing the gel solution, after reacting with the airborne sulfur, with a calibration chart to determine a concentration of sulfur based on the color change. An amount of color change may indicate a level, or concentration, of airborne sulfur. Analyzing the color change may be done automatically by the detection device or manually. The amount of color change may be measured by an absorbance level determined by a photodetector. Color may be detected, or measured, by an amount of light reflected or absorbed. Thus, a photodetector may detect how much light is absorbed by the gel solution (i.e., the absorbance level) to determine the color, or color change, of the gel solution. In some embodiments, a photodetector may include a silicon photodetector, a cadmium zinc telluride radiation detector, a mercury cadmium telluride radiation detector, a light-emitting diode, a photoresistor, a photodiode, a phototransistor, a quantum dot photoconductor, a graphene/silicon photodetector, a photocathode, and a photochemical detector.

In various embodiments, analyzing the color change may include comparing an absorbance level with a threshold absorbance level and, in response to determining that the absorbance level exceeds the threshold absorbance level, generating a trigger alert indicating a high level of airborne sulfur. As discussed herein, the absorbance level may be determined by a photodetector, where the photodetector detects how much light is absorbed by the gel solution. Further, the photodetector converts photons (particles of light) into electric current, in order to measure absorbance. Photons may be unmeasurable, or may be difficult to measure, where electric current may be a quantifiable unit. Converting photons into electric current may allow for a measurement, or numerical representation, of the absorbed light. The amount of electric current may directly correlate to an amount of absorbance, or an absorbance level.

In some embodiments, absorbance levels correlate to different colors, each color having a different absorbance of light. A threshold absorbance level may be a predetermined absorbance level indicating a level of absorbance, or a color change, that corresponds to a concentration of sulfur. In various embodiments, when an absorbance level exceeds the threshold absorbance level, it may be an indication of a concerning amount of airborne sulfur surrounding the gel. A trigger alert may be generated by the detection device to indicate, or provide a warning for, the airborne sulfur. A concerning amount of airborne sulfur may be a concentration of airborne sulfur that may provide damage to devices and equipment in the surrounding area (e.g., data center), damage to humans or other living things, and/or other damages.

In various embodiments, exposing a number of frames of the film (e.g., a single frame) further includes exposing a new frame or frames of the film after a predetermined interval, or a predetermined amount of time. These newly exposed frames (or frame) may then be analyzed for indications of sulfur exposure. This process may repeat until each frame of the film reel is exposed.

Figure 2:
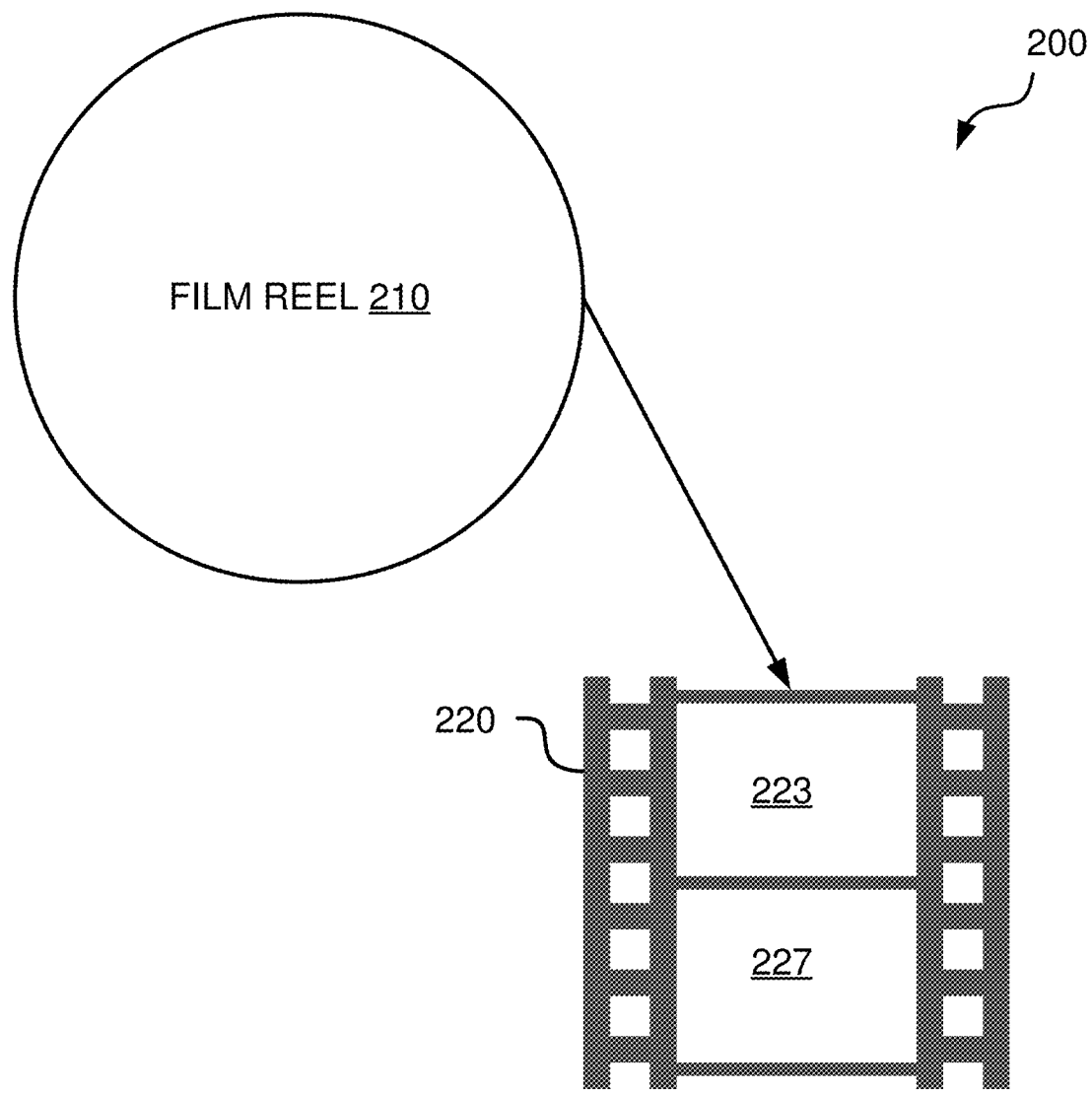
FIG. 2 depicts a schematic diagram of a film reel and frames, according to various embodiments.

Referring to FIG. 2, a schematic diagram 200 of a film reel 210 and frames 223, 227 is depicted, according to various embodiments. Film reel 210 may include a reel with film 220, such as a film strip, wound around the reel. The film 220 may include any quantity of frames 223 and 227. Frames 223 and 227, as with film 220, may be wound around the film reel 210. A film strip may be film 220 with a large quantity of frames. In some embodiments, frame 223 has a gel solution on the surface of the frame. The surface of the frame may include either side of the frame and/or both sides of the frame. Frame 227 may also have the same gel solution of the surface of the frame. In various embodiments, frame 227 is exposed for a period of time, and is then analyzed to determine a possible color change. After the period of time, frame 223 may then be exposed to the surrounding air.

Figure 3:
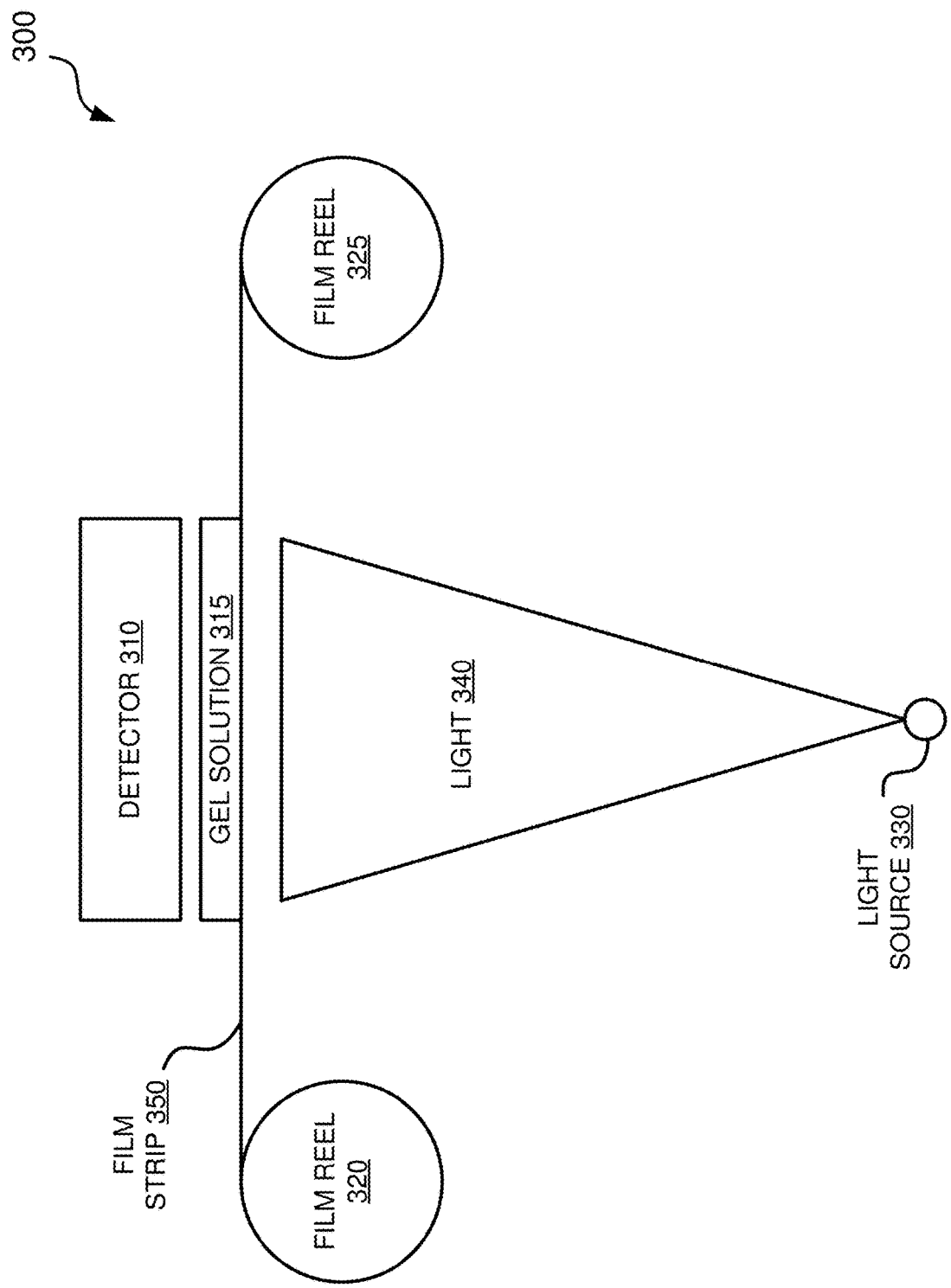
FIG. 3 depicts a schematic diagram of a detection device, according to various embodiments.

Referring to FIG. 3, a schematic diagram of a detection device 300 is depicted, according to various embodiments. Detection device 300 is a sample device and is illustrated for example purposes. Detection device 300 may include a detector 310, and film reels 320 and 325. In various embodiments, detector 310 is a photodetector. Film reels 320 and 325 may correspond to film reel 210 (FIG. 2). Film reel 320 and film reel 325 use a reel-to-reel format. One film reel, such as film reel 320, may be a supply reel, and a second reel, such as film reel 325 may be a take-up reel. The take-up reel may be an initially empty reel connected to film 350 wound in the supply reel. As the film begins moving, or rolling, the take-up reel may wind up the used film, or used frames. The detection device 300 may further include a light source 330, such as light-emitting diode (LED) light to shine on the film strip 350 or frame to detect a color change. After a frame from film strip 350 becomes exposed to the surrounding air (i.e., is unwound from film reel 320), the frame may either be immediately analyzed or analyzed after a predetermined period of time. Analyzing the frame may include aiming a light source 330 that is aiming light 340 at a frame of the film strip 350, and observing the effect of light 340 on gel solution 315. For example, the detector 310 may analyze gel solution 315 by shining light 340 on the gel and detecting how much light is absorbed by the gel. Light may pass through the gel, and the gel may absorb certain light particles (or photons) based on the color of the gel.

In various embodiments, film, such as film strip 350, and a gel solution applied to a film are included in an article of manufacture. Examples of the article of manufacture may include data centers and/or data center devices, corrosion detection devices, and sulfur detectors. In some embodiments, the article of manufacture includes a detection device, such as detection device 300.

The synthetic processes discussed herein and their accompanying drawings are not to be construed as limiting. One skilled in the art would recognize that a variety of reaction conditions can optionally be changed over the course of a process. Further, in some embodiments, processes can be added or omitted while still remaining within the scope of the disclosure, as will be understood by a person of ordinary skill in the art.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture for detecting airborne sulfur, the article of manufacture comprising:
   a film;
   a gel solution applied to the film, wherein the gel solution comprises a gel, a base, and either pyridine or quinoline, and wherein the gel is selected from a group consisting of an acrylamide gel and a polydimethylsiloxane gel; and
   a film reel, wherein the film with the gel solution applied to the film is wound on the film reel.

2. The article of manufacture of claim 1, wherein the gel solution is manufactured to change color in response to a reaction between airborne sulfur and at least one component of the gel solution.

3. A device for detecting airborne sulfur, the device comprising:
   a detector;
   a film;
   a gel solution applied to the film, wherein the gel solution comprises a gel, a base, and either pyridine or quinoline, and wherein the gel is selected from a group consisting of an acrylamide gel and a polydimethylsiloxane gel; and
   a film reel, wherein the film with the gel solution applied to the film is wound on the film reel.

4. The device of claim 3, wherein the detector is configured to detect a color change in the gel solution, wherein the color change is a response to a reaction between the airborne sulfur and at least one component of the gel solution.

5. The device of claim 4, wherein the detector, when detecting the color change, is further configured to:
   determine an absorbance level of the gel solution.

6. The device of claim 4, further comprising:
   a light source, wherein the light source is aimed at the film to help detect the color change.

7. The device of claim 3, wherein the detector is a photodetector.

8. The device of claim 7, wherein the photodetector comprises at least one of a silicon photodetector, a cadmium zinc telluride radiation detector, a mercury cadmium telluride radiation detector, a light-emitting diode, a photoresistor, a photodiode, a phototransistor, a quantum dot photoconductor, a graphene/silicon photodetector, a photocathode, and a photochemical detector.

* * * * *